(12) United States Patent
Landvik et al.

(10) Patent No.: US 11,981,227 B2
(45) Date of Patent: May 14, 2024

(54) DEVICE FOR INSTALLING TRACTION BATTERIES, A SYSTEM AND A VEHICLE

(71) Applicant: Volvo Truck Corporation, Gothenburg (SE)

(72) Inventors: Sondre Landvik, Gothenburg (SE); Krister Andersson, Särö (SE); Roger Hedlund, Hovås (SE); Guilherme Selbach, Hisings Backa (SE); Mikael Boisen, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 277 days.

(21) Appl. No.: 17/441,452

(22) PCT Filed: Mar. 26, 2019

(86) PCT No.: PCT/EP2019/057601
§ 371 (c)(1),
(2) Date: Sep. 21, 2021

(87) PCT Pub. No.: WO2020/192897
PCT Pub. Date: Oct. 10, 2020

(65) Prior Publication Data
US 2022/0161680 A1 May 26, 2022

(51) Int. Cl.
*B60L 53/80* (2019.01)
*B60K 1/04* (2019.01)
(Continued)

(52) U.S. Cl.
CPC .............. *B60L 53/80* (2019.02); *B60K 1/04* (2013.01); *B60L 50/64* (2019.02); *B60L 50/66* (2019.02);
(Continued)

(58) Field of Classification Search
CPC .......... B60L 53/80; B60L 50/64; B60L 50/66; B60L 2200/36; B60K 1/04; B60K 2001/0422; B60Y 2200/145
(Continued)

(56) References Cited

U.S. PATENT DOCUMENTS 4,317,497 A * 3/1982 Alt ...................... H01M 50/209
180/68.5
5,567,542 A * 10/1996 Bae ..................... H01M 50/291
429/120
(Continued)

FOREIGN PATENT DOCUMENTS

DE 102012200350 A1 7/2013
DE 102016113759 A1 4/2017
(Continued)

OTHER PUBLICATIONS

Kane, Mark, "Mercedes-Benz to Start Trial Project With 124 Mile All-Electric Urban eTruck," Insideevs, Feb. 24, 2017, https://insideevs.com/news/332503/mercedes-benz-to-start-trial-project-with-124-mile-all-electric-urban-etruck/, 6 pages.
(Continued)

*Primary Examiner* — Alfonso Perez Borroto
(74) *Attorney, Agent, or Firm* — Withrow & Terranova, PLLC

(57) ABSTRACT

The invention relates to a device for installing traction batteries underneath a cab of a cab-over-engine vehicle. A base portion defines a space into which a portion of a traction battery pack is receivable by lowering the traction battery pack into said space. Front and rear securing element are connected to the base portion for securing the base portion to front and rear bushings, respectively, of the vehicle. At least one of the securing elements comprises a first securing portion for connecting that securing element to one of said bushings, respectively, and a second securing
(Continued)

portion projecting upwardly from the base portion for connecting that securing element to the traction battery pack when the traction battery pack has been received in said space.

17 Claims, 9 Drawing Sheets

(51) Int. Cl.
   *B60L 50/60* (2019.01)
   *B60L 50/64* (2019.01)
   *H01M 50/244* (2021.01)
   *H01M 50/249* (2021.01)
   *H01M 50/262* (2021.01)
   *H01M 50/264* (2021.01)

(52) U.S. Cl.
   CPC ....... *H01M 50/244* (2021.01); *H01M 50/249* (2021.01); *H01M 50/262* (2021.01); *H01M 50/264* (2021.01); *B60K 2001/0422* (2013.01); *B60K 2001/0438* (2013.01); *B60K 2001/0466* (2013.01); *B60L 2200/36* (2013.01); *B60Y 2200/145* (2013.01); *B60Y 2410/115* (2013.01)

(58) Field of Classification Search
   USPC ........................................ 307/10.1
   See application file for complete search history.

(56) References Cited

U.S. PATENT DOCUMENTS

| | | | | |
|---|---|---|---|---|
| 5,806,618 A | * | 9/1998 | Luode ................ | H01M 50/249 |
| | | | | 180/68.5 |
| 2009/0325049 A1 | * | 12/2009 | Niedzwiecki ....... | H01M 50/271 |
| | | | | 429/100 |
| 2015/0349389 A1 | * | 12/2015 | Kobune ................ | B60L 3/0046 |
| | | | | 429/90 |
| 2016/0204401 A1 | * | 7/2016 | Curtis ................ | H01M 50/271 |
| | | | | 429/153 |
| 2017/0117519 A1 | * | 4/2017 | Schoenherr ......... | H01M 50/271 |

FOREIGN PATENT DOCUMENTS

| | | |
|---|---|---|
| DE | 202018100239 U1 | 1/2018 |
| EP | 2319721 B1 | 4/2016 |

OTHER PUBLICATIONS

International Search Report and Written Opinion for International Patent Application No. PCT/EP2019/057601, dated Dec. 4, 2019, 14 pages.

International Preliminary Report on Patentability for International Patent Application No. PCT/EP2019/057601, dated Jan. 29, 2021, 21 pages.

* cited by examiner

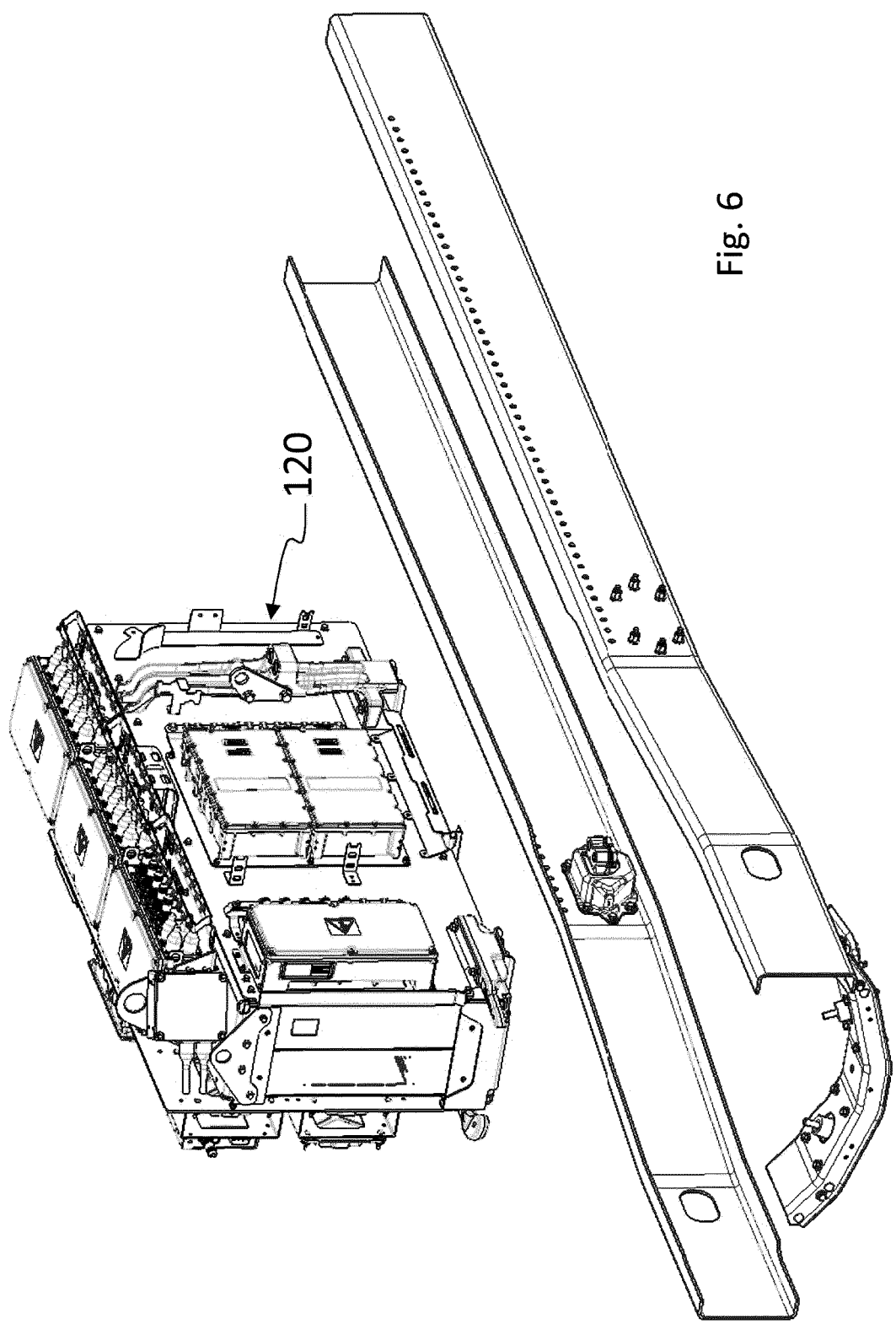

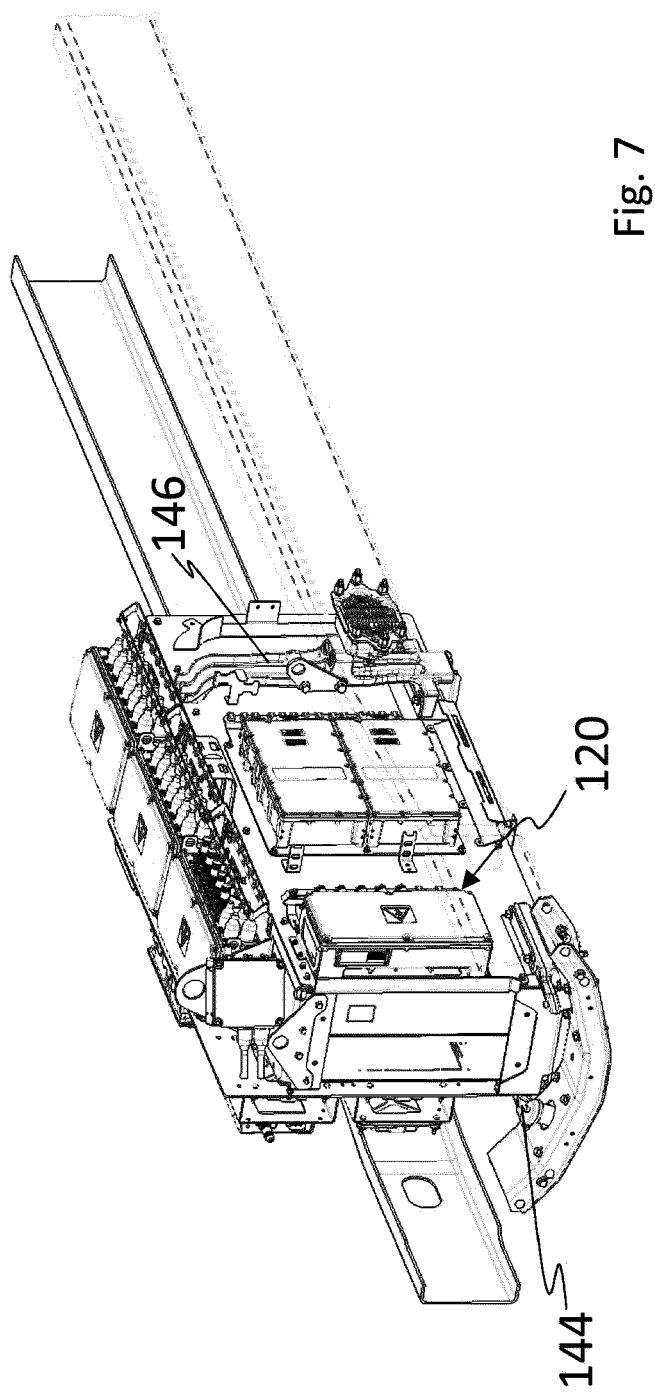

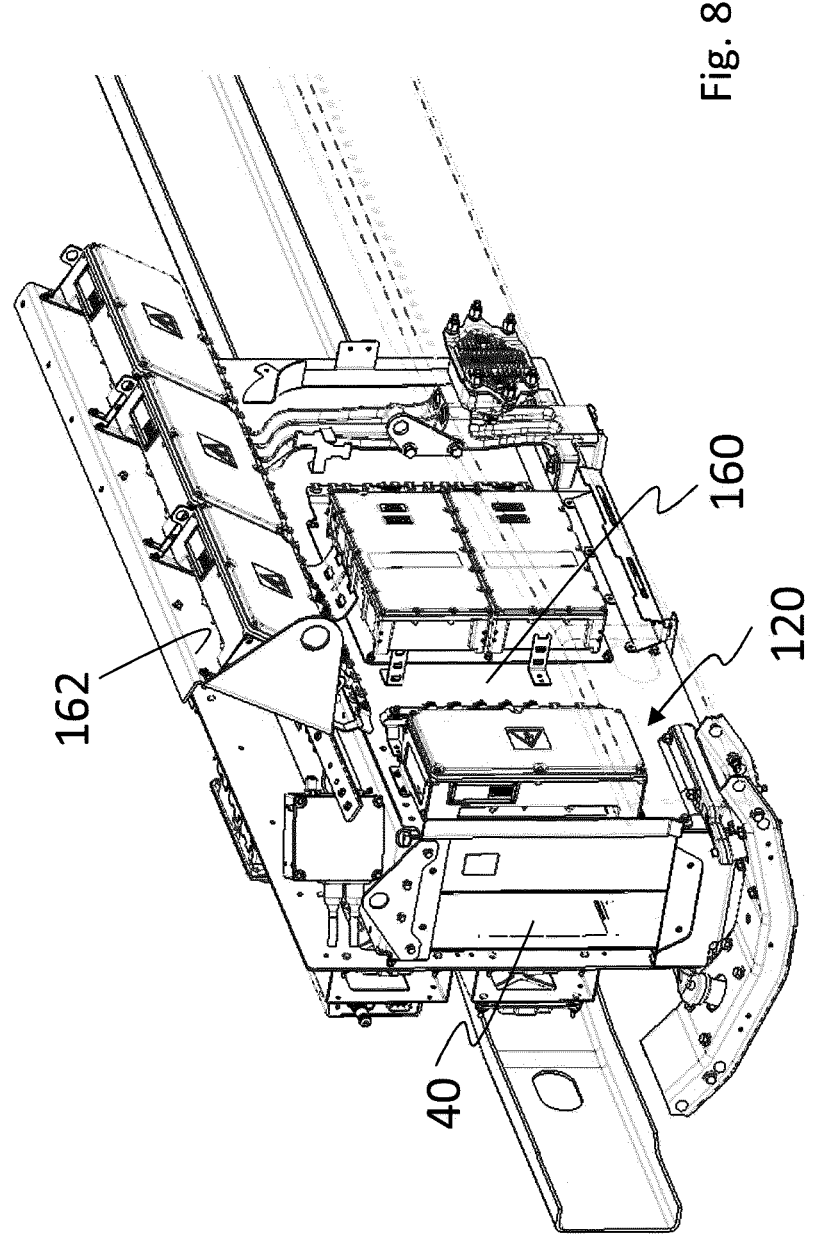

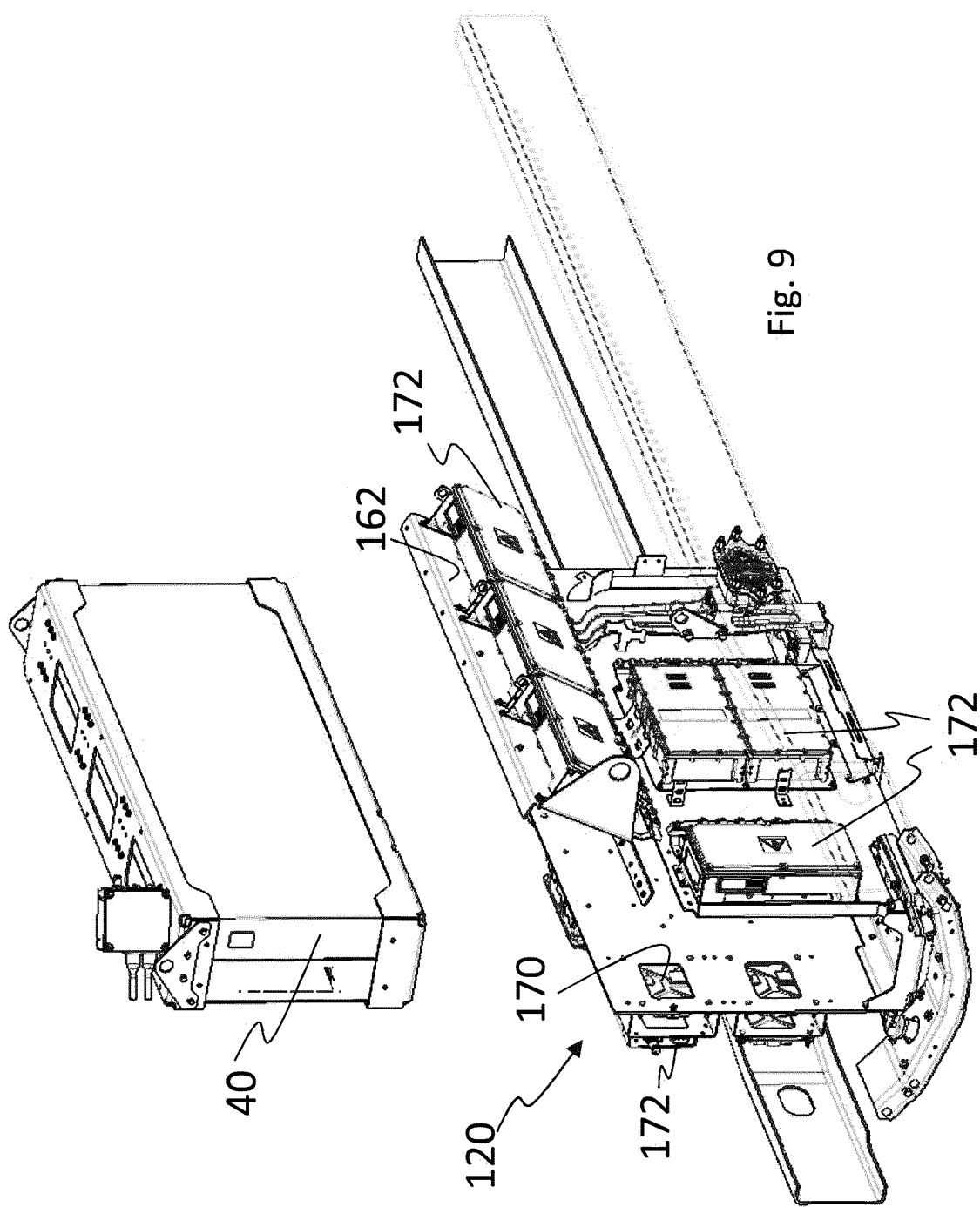

DEVICE FOR INSTALLING TRACTION BATTERIES, A SYSTEM AND A VEHICLE

This application is a 35 USC 371 national phase filing of International Application No. PCT/EP2019/057601, filed Mar. 26, 2019, the disclosure of which is incorporated herein by reference in its entirety.

TECHNICAL FIELD

The invention relates to a device for installing traction batteries underneath a cab of a cab-over-engine vehicle. The invention also relates to a system and to a vehicle comprising such a device.

The invention can be applied in heavy-duty vehicles, such as trucks, buses and construction equipment. Although the invention will be described with respect to a truck, the invention is not restricted to this particular vehicle, but may also be used in other vehicles such as passenger cars.

BACKGROUND

Most trucks today are powered by internal combustion engines. However, there is increasing development of high-voltage traction batteries for replacing internal combustion engines and providing fully electric trucks.

It would be desirable to install such a traction battery underneath the cab of a cab-over-engine vehicle, where the internal combustion engine would normally be located. It is important that the battery pack is safely secured to the vehicle, protecting the battery from torsional and vibration loads from normal truck operation as well as protection in the case of a frontal collision.

DE 10 2016 113 759 A1 discloses a battery pack mounting arrangement for a semi-truck. The arrangement comprises batteries pre-assembled to battery cages. The cages are adapted to fit between two frame rails of said semi-truck. However, it is not specified where on the semi-truck these fame rails are located. A disadvantage with the prior art arrangement is that the cages are large and bulky, and therefore not very suitable for serial production.

It would be desirable to provide a less space-requiring arrangement than the above mentioned cages and which may be provided underneath a cab of a cab-over-engine vehicle. Furthermore, it would be desirable to utilize existing solutions in this part of the vehicle to reduce the need of new components.

SUMMARY

An object of the invention is to provide a device for installing traction batteries underneath a cab of a cab-over-engine vehicle, which device alleviates the drawbacks of the prior art.

According to a first aspect of the invention, the object is achieved by a device according to claim 1. The device comprises:

a base portion having a bottom and an open top, the base portion defining a space into which a portion of a traction battery pack is receivable by lowering the traction battery pack into said space through the open top and towards the bottom, at least one front securing element connected to the base portion for securing the base portion to at least one front bushing of the vehicle, and at least one rear securing element connected to the base portion for securing the base portion to at least one rear bushing of the vehicle, characterized in that at least one of the front and rear securing elements comprises a first securing portion for connecting that securing element to one of said front bushing and rear bushing, respectively, and a second securing portion projecting upwardly from the base portion for connecting that securing element to the traction battery pack when the traction battery pack has been received in said space.

The invention is based on the realization that a simple and time-efficient mounting of a traction battery may be achieved by providing a base portion having a receiving space into which the traction battery may be lowered (similarly to how an internal combustion engine is lowered into place), and that by having securing elements connected to such a base portion, a secure connection can be obtained to both the traction battery and to another part of the vehicle.

The present invention allows for a rapid installation of batteries in a vehicle with few steps, making it advantageous for serial production on an assembly line with short times at each station. Furthermore, it allows for easy disassembling in an aftermarket/service situation.

It should be understood that in this disclosure the "space" defined by the base portion may be defined by four walls portions forming a rectangular cross-section, which surrounds the space. However, it is not necessary that the space is completely surrounded by wall portions. For instance, in some exemplary embodiments the space may be defined by separated wall portions, such as four corner pieces which are spaced apart so that a traction battery, which is lowered into the space, will fit within/mate with the four corner pieces. Other alternative designs may, of course, also be conceivable for defining the receiving space.

Furthermore, it should be understood that while the base portion has an open top for enabling the reception of a traction battery, the bottom of the base portion may be completely closed or may be partially closed. The bottom may, for instance, have one or more holes or perforations for allowing for a cooling air flow to pass around the traction battery.

It should also be understood that the front and rear bushings, to which the front and rear securing elements are configured to be connected, may be existing standard bushings on a vehicle or may be separate bushings applied to the vehicle.

It should furthermore be understood that directional terms such as top, bottom, upwardly, downwardly, etc. are defined with respect to normal operating conditions. For instance, upwardly coincides with a direction which extends from the bottom of the base portion towards and/or beyond the top of the base portion. In practice, for the traction battery to be lowered into the space, the top of the bottom portion will normally be located farther from the ground on which a vehicle stands, while the bottom of the base portion will be located closer to the ground.

According to at least one exemplary embodiment, the rear securing element comprises a first securing portion for connecting the rear securing element to the rear bushing, and a second securing portion projecting upwardly from the base portion for connecting the rear securing element to the traction battery pack when the traction battery pack has been received in said space. This allows for a simple and secure connection to the traction battery. However, it should be understood, that in other exemplary embodiments the front securing element may, instead of or in addition to, the rear securing element comprise a securing portion which projects upwardly from the base portion for connecting the front securing element to the traction battery pack when the traction battery pack has been received in said space.

According to at least one exemplary embodiment, an uppermost part of the second securing portion comprises fastening means for connecting the second securing portion to the traction battery pack when the traction battery pack has been received in said space. By providing fastening means at the uppermost part of the second securing portion, a secure and stable connection to the traction battery may be achieved. The uppermost portion may suitably have a length that substantially corresponds to the width/height of a traction battery pack, such that the fastening means can be attached to an upper part of the traction battery pack. It should be understood that the fastening means may comprise holes for receiving bolts/screws, and/or the fastening means may comprise bolts/screws as such. However, other types of fastening means are also conceivable. Furthermore, it should be understood that the fastening means may be directly connectable to a traction battery pack, or indirectly connectable to the traction battery pack via other component(s).

According to at least one exemplary embodiment, the device comprises two rear securing elements connected at opposite lateral sides of the base portion, wherein each one of the two rear securing elements comprises a first securing portion for connecting the rear securing element to the rear bushing, and a second securing portion projecting upwardly from the base portion for connecting the rear securing element to the traction battery pack when the traction battery pack has been received in said space, wherein the second securing portions of the respective rear securing element are adapted to extend along opposite sides of the traction battery pack when the traction battery pack has been received in said space. This is advantageous since the traction battery pack may be supported from two sides by the upwardly projecting first and second securing portions of the respective rear securing elements.

According to at least one exemplary embodiment, the device comprises two front securing elements connected at and extending forwardly from opposite lateral sides of the base portion. This is advantageous since it allows the device to be stably and securely connected to the front bushings of the vehicle.

According to at least one exemplary embodiment, the device comprises a casing adapted to at least partly surround the traction battery pack when it has been received in the base portion. This is advantageous since a casing may provide extra protection to the traction battery pack and/or may provide a structure for holding auxiliary components, such as electromobility components, connectors, cables etc. It should be understood that a casing may be provided in various forms, shapes and configurations. For instance, a casing may be in the form of a box having an openable top part through which a traction battery pack may be lowered or removed. In other exemplary embodiments, a casing may be in the form of a number of mounting plates which together may enclose the traction battery pack.

Thus, according to at least one exemplary embodiment, said casing comprises a plurality of mounting plates adapted to at least partly surround the traction battery pack when it has been received in the base portion. This allows for an efficient manufacturing of different mounting plates provided with different auxiliary components, if desired.

According to at least one exemplary embodiment, said casing comprises a top mounting plate which is at least partly removable from the casing for enabling accessing and lifting out the traction battery from the casing, an/or inserting a traction battery into the casing. The top mounting plate may advantageously be one of a plurality of mounting plates, or forming a lid to a box-shaped casing.

According to at least one exemplary embodiment, the casing comprises one or more connectors on the inside of the casing for connecting electromobility components, such as junction boxes, control units and/or wiring, to the traction battery pack. This is advantageous since the device may, in addition to holding a traction battery pack, also hold operatively connectable electromobility components. Such electromobility components may suitably be provided on the outside of the casing, e.g. attached to a mounting plate, and may via e.g. appropriate connectors be operatively connected to the traction battery pack.

According to at least one exemplary embodiment, said one or more connectors are provided on the top mounting plate, wherein the top mounting plate and any attached electromobility component are at least partly removable from the rest of the casing. This is advantageous since, even though the top mounting plate is at least partly removable, it may be used for supporting components, thus, allowing a greater part of the casing to be used for component support.

According to at least one exemplary embodiment, the device comprises said electromobility components, wherein said electromobility components are connected to said one or more connectors. Thus, the electromobility components may advantageously form part of a complete package allowing for simple and efficient assembling on an assembly line.

According to a second aspect of the invention, the object is achieved by a system according to claim 12. The system comprises a device according to the first aspect (including any embodiment thereof) and a traction battery pack receivable by said base portion of the device by lowering the traction battery pack into said space through the open top and towards the bottom. The advantages are analogous to those discussed above.

According to at least one exemplary embodiment, the system comprises at least one integrated protecting bracket fixed to the traction battery pack for protecting the traction battery pack during transportation. This provides for a safe and secure handling of the traction battery pack. Furthermore, the integrated protecting bracket may have further functionality in addition to the protecting function. For instance, it may provide a lifting functionality i.e. an area suitable for gripping and lifting the traction battery pack, and/or it may provide an area suitable for connecting the traction battery pack to other parts of the system.

Thus, according to at least one exemplary embodiment, said second securing portion projecting upwardly from the base portion, is adapted to be connected to the integrated protecting bracket. This is advantageous since the integrated protecting bracket will have dual functionality, providing a means to connect the traction battery to the base portion.

According to at least one exemplary embodiment, the traction battery pack has a length l, width w and thickness t, wherein l>w>t, wherein each one of the top surface and the bottom surface of the traction battery pack is defined by the length l and the thickness t, wherein the base portion is dimensioned to mate with the bottom surface of the traction battery pack by lowering the bottom surface into said space. By having the traction battery pack in such a standing position, it does not require much space in the lateral direction and can therefore be provided in a base portion which can be dimensioned to fit well with the locations of existing bushings.

According to at least one exemplary embodiment, the integrated protecting bracket covers the top surface. This is advantageous as it may provide an appropriate means for securing the upwardly projecting second securing portion. This is also reflected in the following exemplary embodiment.

Thus, according to at least one exemplary embodiment, the second securing portion projects upwardly a distance substantially corresponding to the width w of the traction battery pack. This allows for a firm securing of the traction battery pack.

According to a third aspect of the invention, the object is achieved by a vehicle according to claim 18. The vehicle comprises a device according to the first aspect of the invention (including any embodiment thereof) or a system according to the second aspect of the invention (including any embodiment thereof).

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 6 illustrates how the device of FIG. 5 may be connected to a vehicle, FIG. 7 illustrates the device of FIG. 5 connected to a part of the vehicle, and FIGS. 8 and 9 illustrate how a traction battery pack may be removed from the device.

DETAILED DESCRIPTION OF EXAMPLE EMBODIMENTS OF THE INVENTION

Figure 1:
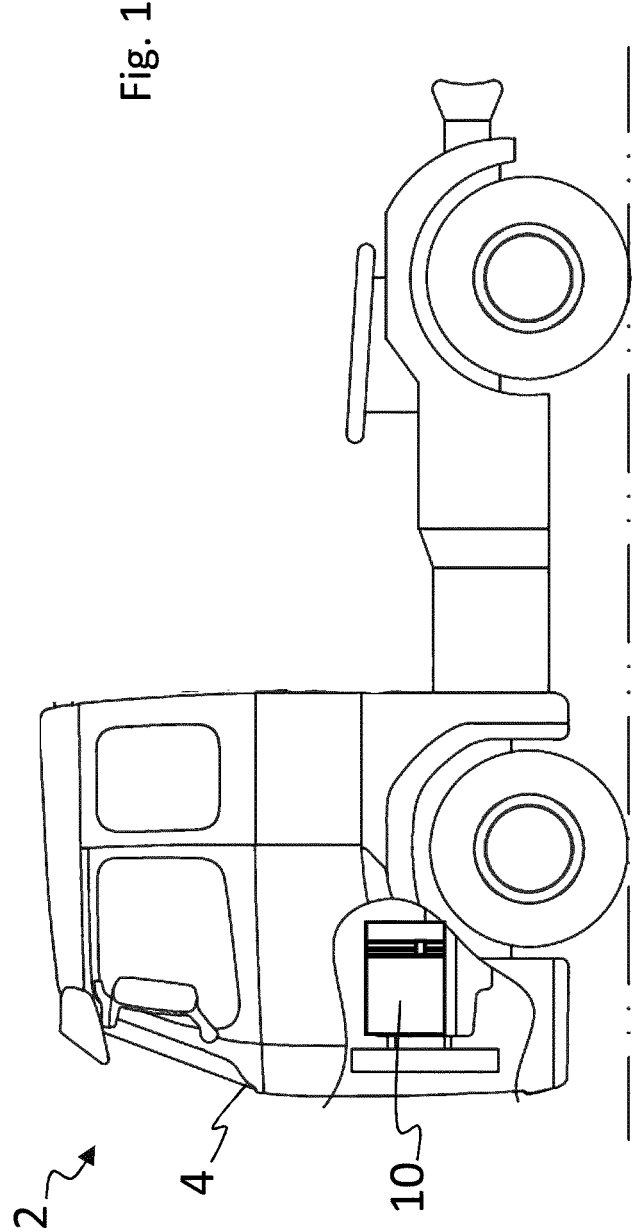
FIG. 1 is a schematic illustration of a vehicle comprising a device and system according to at least one exemplary embodiment of the invention.

FIG. 1 is a schematic illustration of a vehicle 2 comprising a device and system according to at least one exemplary embodiment of the invention. Although the vehicle 2 is illustrated in the form of a truck, other types of vehicles, such as busses or construction equipment may be used with the inventive device and system.

The truck 2 comprises a cab 4 in which a driver may operate the vehicle 2. As schematically illustrated underneath the cab 4, where there would normally have been an internal combustion engine, there is instead provided a device and system 10 according to the invention. The system 10 comprises a traction battery pack and the device holding the traction battery pack. More detailed exemplary embodiments of the device and the system will be discussed with reference to the other drawings.

Figure 2:
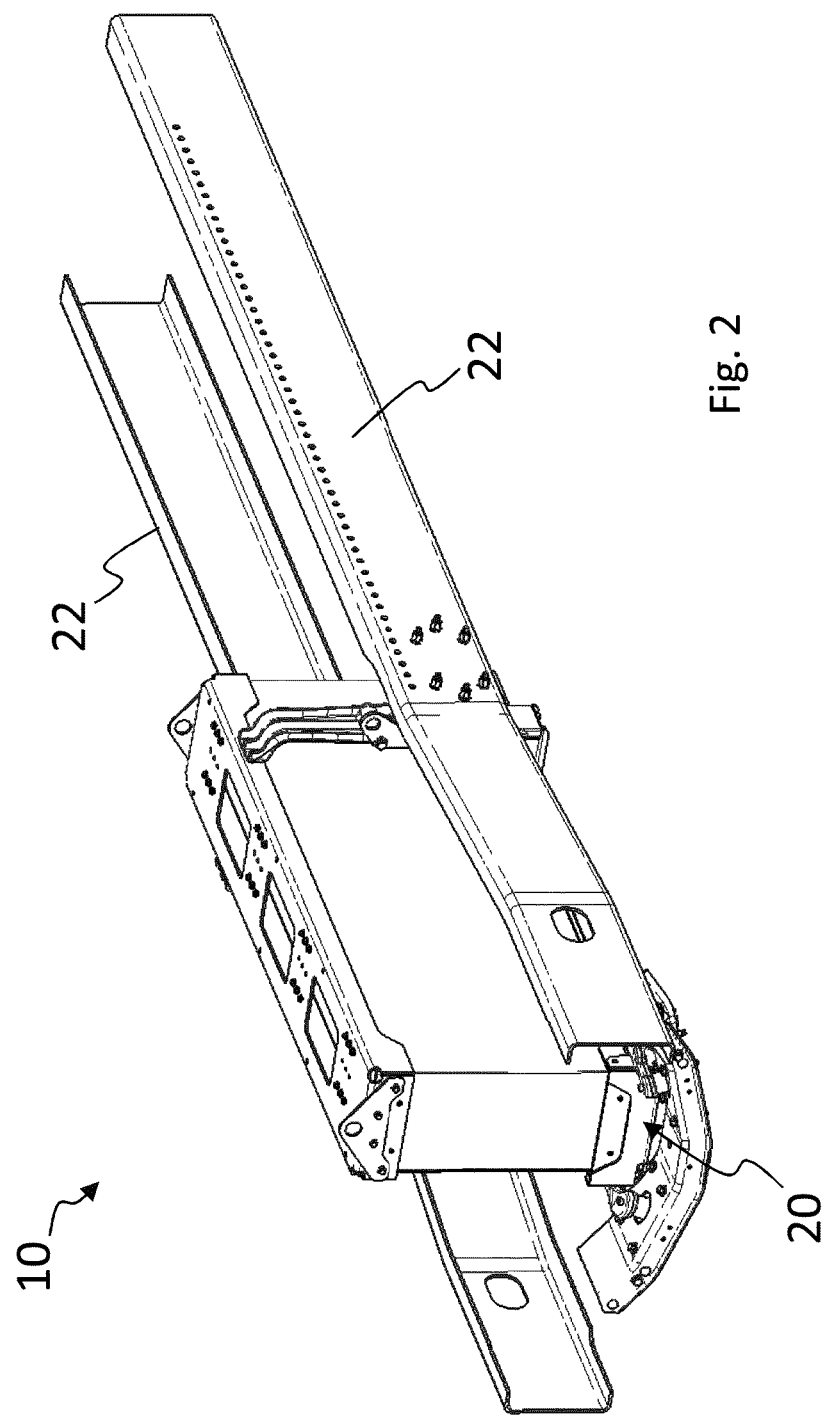
FIG. 2 is a schematic illustration of a device and a system according to at least one 30 exemplary embodiment of the invention.
Figure 3:
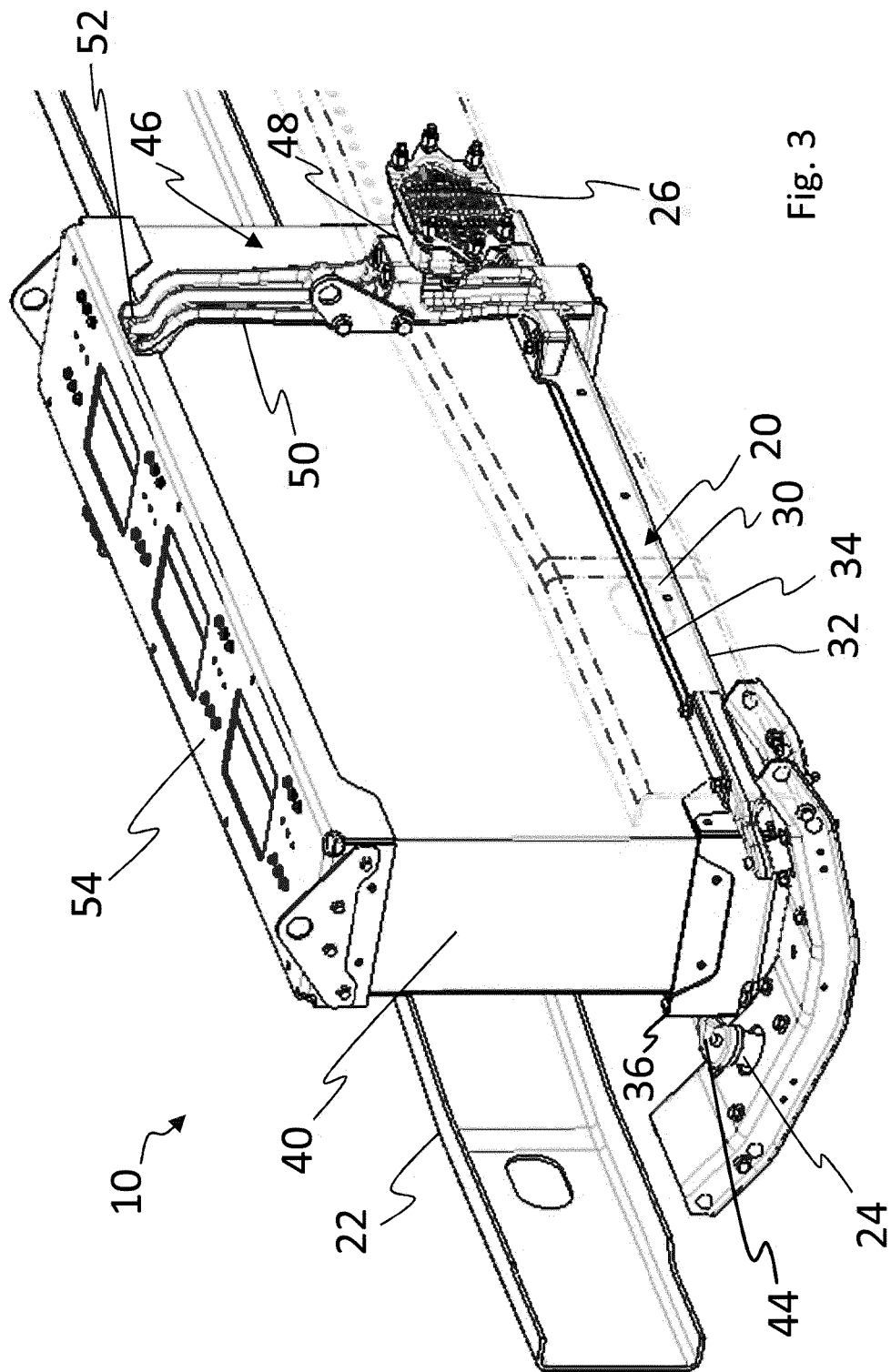
FIG. 3 is a close-up view of the device and the system of FIG. 2.

FIG. 2 is a schematic illustration of a device 20 and a system 10 according to at least one exemplary embodiment of the invention, and FIG. 3 is a close-up view of the device 20 and the system 10 of FIG. 2. The device 20 is for installing traction batteries underneath a cab of a cab-over-engine vehicle, such as the one illustrated in FIG. 1. In other words, where an engine (such as an internal combustion engine) would normally be located under a cab, there may instead be (or additionally be) placed a traction battery. This is catered for by means of the inventive device 20.

As shown in FIG. 2, the device 20 has been installed between two beams 22 of a chassis of the vehicle. In FIG. 3 one of the beams have been removed for clarity purposes. FIGS. 2 and 3 also show that the vehicle is equipped with front bushings 24 and rear bushings 26. These may be standard parts of a vehicle, however, separately provided bushings for connecting the device 20 are also conceivable. Regardless of which, the front and rear bushings 24, 26 are suitably secured to the two beams 22.

As best seen in FIG. 3, the device 20 comprises a base portion 30 having a bottom 32 and an open top 34. The base portion 30 defines a space into which a portion of a traction battery pack 40 is receivable by lowering the traction battery pack 40 into said space through the open top 34 and towards the bottom 32. The base portion 30 is here illustrated as having raised corner pieces 36 which define a geometrical boundary and thus said space within which the traction battery pack 40 may be received. In other embodiments, the base portion 30 may instead have a continuous frame or surrounding wall or the like for defining said space. As illustrated in FIG. 3, in this exemplary embodiment only a minor lower portion of the traction battery pack 40 is received by the base portion 30. The major portion of the traction battery pack 40 extends upwardly of the base portion 30.

At least one front securing element 44 is provided. In the illustrated exemplary embodiment there are two front securing elements. The front securing elements 44 are connected to the base portion 30 for securing the base portion 30 to at least one front bushing 24 of the vehicle (in the illustrated exemplary embodiment there are two front bushings, one for each front securing element). In the illustrated exemplary embodiment, the front securing elements 44 extend forwardly from the base portion 30. However, the base portion 30 may be configured and dimensioned differently in other embodiments, and for instance, allow a lateral projection of the front securing elements. In the illustrated exemplary embodiment, the front securing elements 44 are tilted relative to the base portion 30 (and therefore relative to the ground on which the vehicle stands, assuming normal operation and mounting of the device). However, non-tilted extensions are also conceivable.

Similarly, there is provided at least one rear securing element 46. Although not visible in FIGS. 2 and 3, it is assumed that the illustrated exemplary embodiment has two rear securing elements 46, one on each lateral side of the base portion 30, which are configured to secure the base portion 30 to respective rear bushings 26.

Each rear securing element 46 comprises a first securing portion 48 for connecting the rear securing element 46 to a respective rear bushing 26 and a second securing portion 50 projecting upwardly from the base portion 30 for connecting the rear securing element 46 to the traction battery pack 40 when the traction battery pack 40 has been received in said space. In other exemplary embodiments, it would be conceivable to design each front securing element to comprise a first securing portion for connecting the front securing element to a respective front bushing and a second securing portion projecting upwardly from the base portion for connecting front securing element to the traction battery pack 40.

As illustrated in FIG. 3 the first securing portion 48 is located above the base portion 30 and level with the rear bushing 26. For other placement of the rear bushing the first securing portion would be located elsewhere, for instance level with the base portion.

The second securing portion 50 is illustrated as an elongated bracket extending upwardly from the base portion 30. It has an extension which substantially corresponds to the width/height of the traction battery pack 40. An uppermost part of the second securing portion comprises fastening means 52 for connecting the second securing portion 50 to the traction battery pack 40. The fastening means 52 may for example be rivets, bolts, pre-tensioned spring elements, or other suitable means for holding the traction battery in place.

Figure 4:
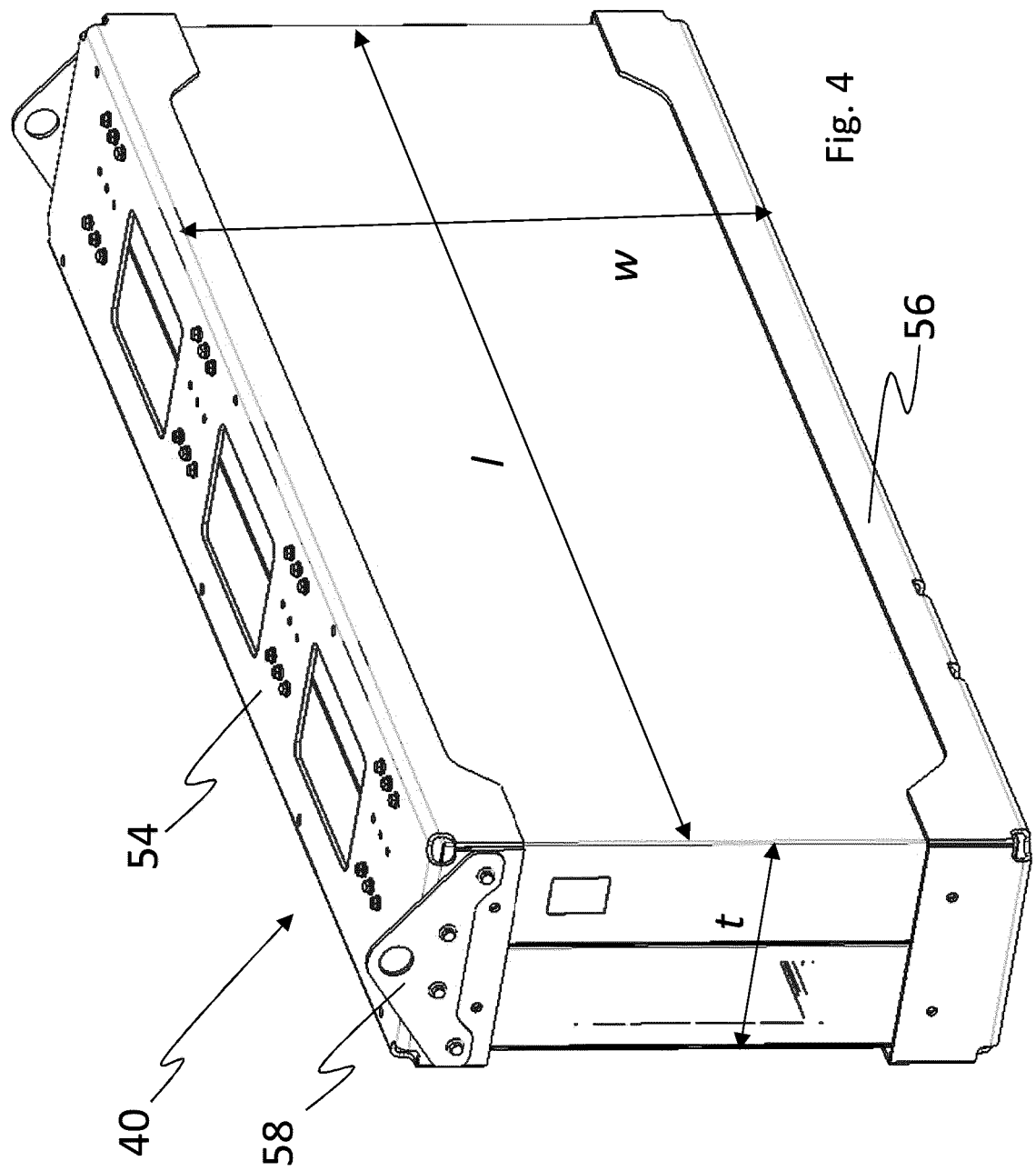
FIG. 4 is a schematic illustration of a traction battery pack for use in a system according to at least one exemplary embodiment of the invention.

FIG. 4 is a schematic illustration of a traction battery pack 40 for use in a system according to at least one exemplary embodiment of the invention. At least one integrated protecting bracket may be fixed to the traction battery pack for protecting the traction battery pack during transportation. In FIG. 4 there is illustrated an upper protecting bracket 54 covering a top portion of the traction battery pack 40, and a lower protecting bracket 56 covering a bottom portion of the traction battery pack 40. Two lifting brackets 58 are attached to the upper protecting bracket 54 for gripping and lifting the traction battery pack 40. In other example embodiments, one of the upper protecting bracket 54 and lower protecting bracket 56 may be provided with one or more integral lifting portions made in one piece with the protecting bracket.

As illustrated in FIG. 3, the second securing portion 50 of the rear securing element 46 projects upwardly from the base portion 30, and is adapted to be connected to the integrated upper protecting bracket 54.

Turning back to FIG. 4, the traction battery pack 40 has a length l, width w and thickness t, wherein l>w>t, wherein each one of the top surface and the bottom surface of the traction battery pack 40 is defined by the length l and the thickness t, wherein the base portion is dimensioned to mate with the bottom surface of the traction battery pack 40 by lowering the bottom surface into said space. Accordingly, in FIG. 4, the integrated upper protecting bracket 54 covers the top surface and also extend down slightly on the lateral surfaces. Furthermore, as is understood from FIG. 3, the second securing portion 50 may project upwardly a distance substantially corresponding to the width w of the traction battery pack 40.

Figure 5:
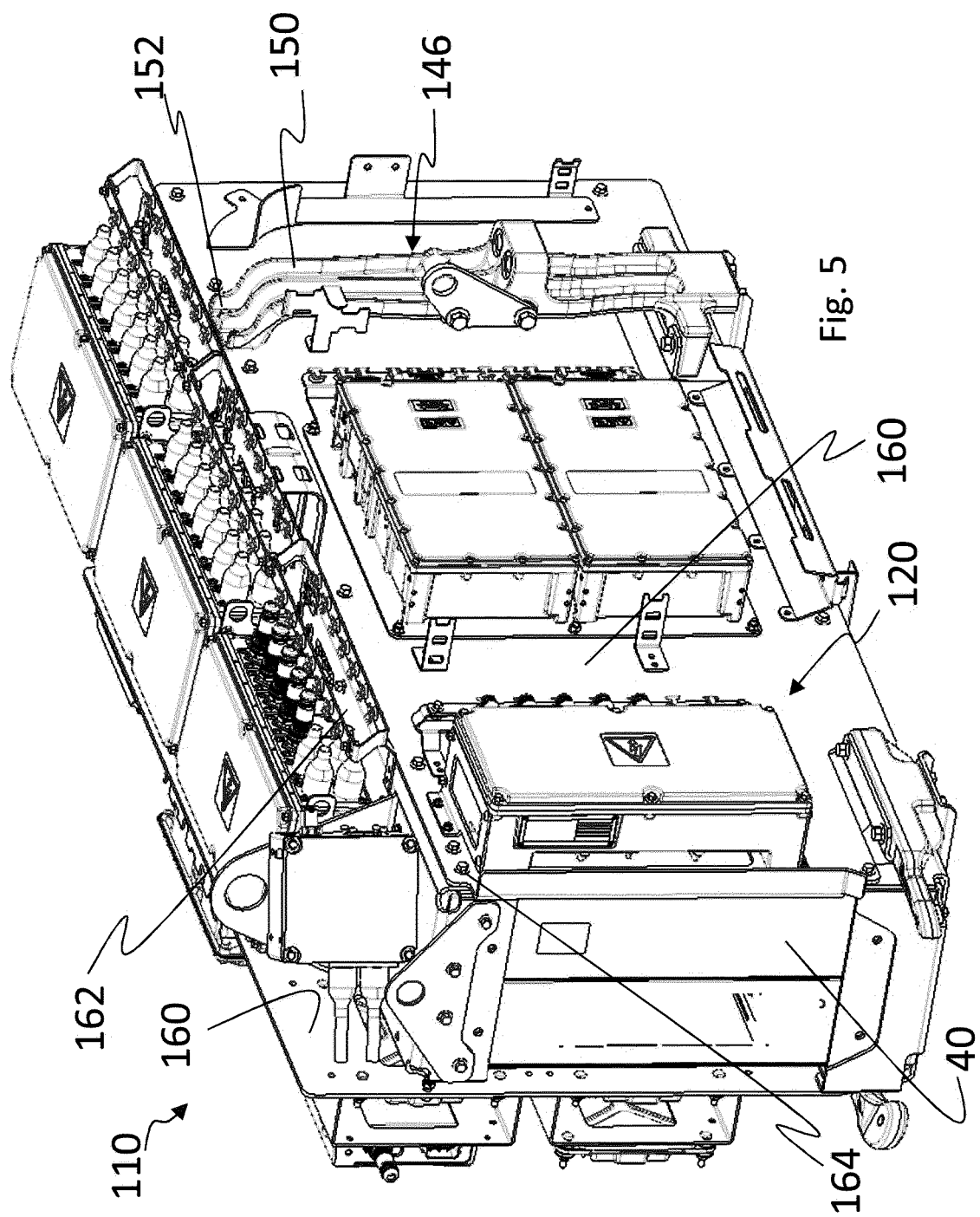
FIG. 5 is a schematic illustration of a device and a system according to at least one exemplary embodiment of the invention.

FIG. 5 is a schematic illustration of a system 110 and a device 120 according to at least one exemplary embodiment of the invention. In addition to the parts of the exemplary embodiment illustrated in FIGS. 2 and 3, the exemplary embodiment of FIG. 5 further comprises a casing adapted to at least partly surround the traction battery pack when it has been received in the base portion. In this illustrated exemplary embodiment, the casing comprises two opposite lateral mounting plates 160 and a top mounting plate 162. In other exemplary embodiments additional mounting plates are conceivable.

As illustrated in FIG. 5, apart from the fastening means 152, such as bolts, at the upper end of the second securing portion 150 of the rear securing element 146, there are provided a plurality of additional fastening means 164, such as bolts, for keeping the lateral mounting plates 160 connected to the traction battery pack 40. The fastening means 152 at the second securing portion 150 as well as the additional fastening means 164 penetrate through the lateral mounting plate 160 to connect the device to the traction battery pack. Furthermore, both fastening means 152, 164 may be connected to an integrated protection bracket, such as the upper protection bracket 54 illustrated in FIG. 4. In exemplary embodiments there may similarly be provided fastening means for fixating the top mounting plate 162 to the traction battery pack 40 or to one of the lateral mounting plates 160.

A system 110 of the invention may comprise a device 120 according to the invention in combination with a traction battery pack 40.

FIG. 6 illustrates how the device 120 of FIG. 5 may be connected to a vehicle, and FIG. 7 illustrates the device 120 of FIG. 5 connected to a part of the vehicle similarly to the exemplary embodiment of FIG. 3. Thus, front securing elements 144 and rear securing elements 146 may be connected to front bushings and rear bushings, respectively.

FIGS. 8 and 9 illustrate how a traction battery pack 40 may be removed from the device 120. As shown in FIG. 8, the fastening means 152, 164 in FIG. 5 may be removed thereby releasing the traction battery pack 40 from the connecting with the lateral mounting plates 160. Furthermore, the top mounting plate 162 may be completely or at least partly removable from the casing for enabling accessing and lifting out the traction battery 40 from the casing, an/or inserting a traction battery 40 into the casing. In the illustrated figures the casing comprises the two lateral mounting plates 160 and the top mounting plate 162, and the top mounting plate 162 is movable relative to at least one of the lateral mounting plates 160, by a pivoting motion (like opening a hinged hatch).

As illustrated in FIG. 9, after opening the top mounting plate 162 the traction battery pack 40 may be removed. The casing may comprise one or more connectors 170 on the inside of the casing for connecting electromobility components 172, such as junction boxes, control units and/or wiring, to the traction battery pack 40. Said one or more connectors 170 may be provided on the top mounting plate 162, wherein the top mounting plate 162 and any attached electromobility component 172 are at least partly removable from the rest of the casing. The one or more connectors 170 may, of course, also be provided on the lateral mounting plates 160. The electromobility components 172 may, in at least some exemplary embodiments form part of the device 120 as such, wherein the electromobility components 172 are connected to said one or more connectors 170.

It is to be understood that the present invention is not limited to the embodiments described above and illustrated in the drawings; rather, the skilled person will recognize that many changes and modifications may be made within the scope of the appended claims.

The invention claimed is:

1. A device for installing traction batteries underneath a cab of a cab-over-engine vehicle, the device comprising:
   a base portion having a bottom and an open top, the base portion defining a space into which a portion of a traction battery pack is receivable by lowering the traction battery pack into the space through the open top and towards the bottom,
   at least one front securing element connected to the base portion and configured to secure the base portion to at least one front bushing of the vehicle, and
   at least one rear securing element connected to the base portion and configured to secure the base portion to at least one rear bushing of the vehicle, wherein at least one of the front and rear securing elements comprises a first securing portion for connecting that securing element to one of the front bushing and rear bushing, respectively, and a second securing portion projecting upwardly from the base portion for connecting that securing element to the traction battery pack when the traction battery pack has been received in the space.

2. The device of claim 1, wherein the rear securing element comprises a first securing portion for connecting the rear securing element to the rear bushing, and a second securing portion projecting upwardly from the base portion for connecting the rear securing element to the traction battery pack when the traction battery pack has been received in the space.

3. The device of claim 1, wherein an uppermost part of the second securing portion comprises a fastener for connecting the second securing portion to the traction battery pack when the traction battery pack has been received in the space.

4. The device of claim 1, comprising two rear securing elements connected at opposite lateral sides of the base portion, wherein each one of the two rear securing elements comprises a first securing portion for connecting the rear securing element to the rear bushing, and a second securing portion projecting upwardly from the base portion for connecting the rear securing element to the traction battery pack when the traction battery pack has been received in the space, wherein the second securing portions of the respective rear securing element are adapted to extend along opposite sides of the traction battery pack when the traction battery pack has been received in the space.

5. The device of claim 1, comprising two front securing elements connected at and extending forwardly from opposite lateral sides of the base portion.

6. The device of claim 1, further comprising a casing adapted to at least partly surround the traction battery pack when it has been received in the base portion.

7. The device of claim 6, wherein the casing comprises a plurality of mounting plates adapted to at least partly surround the traction battery pack when the traction battery pack has been received in the base portion.

8. The device of claim 6, wherein the casing comprises a top mounting plate which is at least partly removable from the casing for enabling accessing and lifting out the traction battery from the casing, and/or inserting a traction battery into the casing.

9. The device of claim 6, wherein the casing comprises one or more connectors on the inside of the casing for connecting electromobility components.

10. The device of claim 9, wherein:
the casing comprises a top mounting plate which is at least partly removable from the casing for enabling accessing and lifting out the traction battery from the casing, and/or inserting a traction battery into the casing; and
the one or more connectors are provided on the top mounting plate, wherein the top mounting plate and any attached electromobility component are at least partly removable from the rest of the casing.

11. The device of claim 9, further comprising the electromobility components, wherein the electromobility components are connected to the one or more connectors.

12. A system comprising:
a device for installing traction batteries underneath a cab of a cab-over-engine vehicle, the device comprising:
a base portion having a bottom and an open top, the base portion defining a space into which a portion of a traction battery pack is receivable by lowering the traction battery pack into the space through the open top and towards the bottom,
at least one front securing element connected to the base portion for securing the base portion to at least one front bushing of the vehicle, and
at least one rear securing element connected to the base portion for securing the base portion to at least one rear bushing of the vehicle,
wherein at least one of the front and rear securing elements comprises a first securing portion for connecting that securing element to one of the front bushing and rear bushing, respectively, and a second securing portion projecting upwardly from the base portion for connecting that securing element to the traction battery pack when the traction battery pack has been received in the space, and
a traction battery pack receivable by the base portion of the device by lowering the traction battery pack into a space through the open top and towards the bottom.

13. The system of claim 12, comprising at least one integrated protecting bracket fixed to the traction battery pack for protecting the traction battery pack during transportation.

14. The system of claim 13, wherein the second securing portion projecting upwardly from the base portion, is adapted to be connected to the integrated protecting bracket.

15. The system of claim 12, wherein the traction battery pack has a length l, width w and thickness t, wherein l>w>t, wherein each one of the top surface and the bottom surface of the traction battery pack is defined by the length l and the thickness t, wherein the base portion is dimensioned to mate with the bottom surface of the traction battery pack by lowering the bottom surface into the space.

16. The system of claim 15 comprising at least one integrated protecting bracket fixed to the traction battery pack for protecting the traction battery pack during transportation, the integrated protecting bracket covers the top surface.

17. The system of claim 15, wherein the second securing portion projects upwardly a distance substantially corresponding to the width w of the traction battery pack.

* * * * *